(12) United States Patent  
Braydon

(10) Patent No.: US 9,332,733 B1  
(45) Date of Patent: May 10, 2016

(54) ANIMAL TRAINING AND CONTROL DEVICE

(71) Applicant: Krauser Pet Products, LLC, Bartlett, IL (US)

(72) Inventor: Bradley B. Braydon, Mishawaka, IN (US)

(73) Assignee: Krauser Pet Products LLC, Bartlett, IL (US)

( * ) Notice: Subject to any disclaimer, the term of this patent is extended or adjusted under 35 U.S.C. 154(b) by 313 days.

(21) Appl. No.: 13/795,260

(22) Filed: Mar. 12, 2013

Related U.S. Application Data

(60) Provisional application No. 61/609,443, filed on Mar. 12, 2012.

(51) Int. Cl.  
*A01K 27/00* (2006.01)  
*A01K 15/00* (2006.01)

(52) U.S. Cl.  
CPC .............. *A01K 27/001* (2013.01); *A01K 15/00* (2013.01)

(58) Field of Classification Search  
CPC ... A01K 15/006; A01K 15/04; A01K 27/001; A01K 27/002; A01K 15/00; A01K 25/00  
USPC ......... 119/855, 856, 858, 814–815, 821–835, 119/758, 760–764, 766, 864, 850  
See application file for complete search history.

(56) References Cited

U.S. PATENT DOCUMENTS

| | | | |
|---|---|---|---|
| 2,313,833 A | 3/1943 | Marmet | |
| 2,595,302 A * | 5/1952 | Sanders | 119/815 |
| 2,704,428 A | 3/1955 | Sessler | |
| 4,782,824 A | 11/1988 | Davies | |
| D452,569 S | 12/2001 | Bugarin | |
| 6,409,694 B1 | 6/2002 | Bugarin | |
| 2009/0264802 A1 * | 10/2009 | Chen | A61F 5/055 602/18 |
| 2010/0024744 A1 | 2/2010 | Baillie | |
| 2010/0042030 A1 | 2/2010 | Barnes | |

* cited by examiner

*Primary Examiner* — Joshua Huson  
(74) *Attorney, Agent, or Firm* — John F. Rollins

(57) ABSTRACT

A dog collar includes a first end for positioning under a dog's jaw bone and a second end that rests on the dog's upper chest. The first and second ends are connected by substantially arched sections that extend up along each side of the dog's neck and continue down between the dog's shoulders such that second end 22 rests on the dog's upper chest such that the collar does not overlie the dog's trachea.

13 Claims, 8 Drawing Sheets

ANIMAL TRAINING AND CONTROL DEVICE

The present invention generally relates to animal training and control devices and, in particular, to a dog collar.

BACKGROUND AND SUMMARY OF THE INVENTION

Various types of animal training and control devices are known. Such devices are used to guide animals and to prevent them from wandering off. Dog collars are one such type of device.

In one embodiment of the present invention, a dog collar includes a member for positioning on the front of a dog. The member includes first and second sections extending along the dog's neck on opposite sides thereof. The member further includes a first end for positioning beneath the dog's lower jaw and a second end for positioning adjacent the dog's chest. The first and second ends connect the first and second sections to form a closed loop having a central opening overlying the dog's trachea.

In one embodiment of the invention, the dog collar further includes a strap for positioning adjacent the back of the dog's neck. The strap has a first end connected to the first member and a second end connected to the first member.

In another embodiment of the invention, the first and second sections each include a first end and a second end. A third section extends at an angle from the first end of the first section and is connected to the first end of the member. A fourth section extends at an angle from the first end of the second section and is connected to the first end of the member. The angle in certain embodiments is between approximately 135 degrees to 140 degrees.

In another embodiment of the invention, the collar further includes a fifth section extending from the second end of the first section at an angle thereto. The fifth section is connected to the second end of the member. A sixth section extends at an angle from the second end of the second section and is connected to the second end of the member. The angle in certain embodiments of the invention is between approximately 145 degrees to 150 degrees.

DETAILED DESCRIPTION OF EMBODIMENTS OF THE INVENTION

Figure 1:
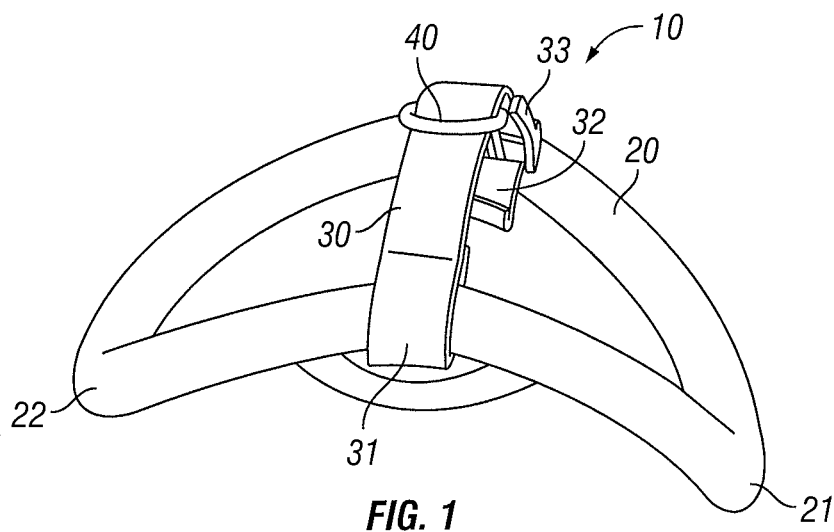
FIG. 1 is a perspective view of a dog collar according to one embodiment of the present invention.
Figure 2:
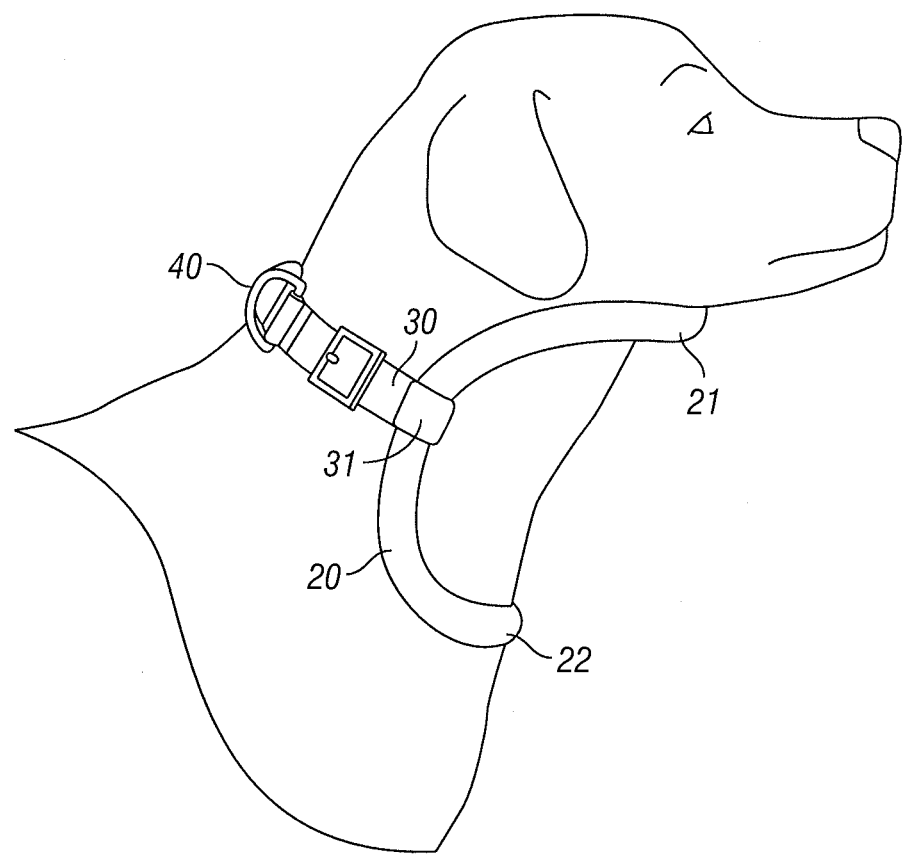
FIG. 2 is a right side view of the dog collar of FIG. 1 positioned on a dog.
Figure 3:
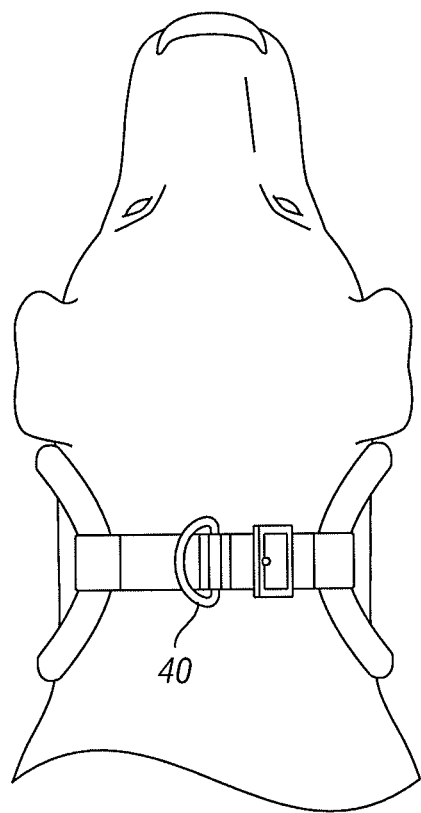
FIG. 3 is a top plan view of the dog collar of FIG. 1 positioned on a dog.
Figure 4:
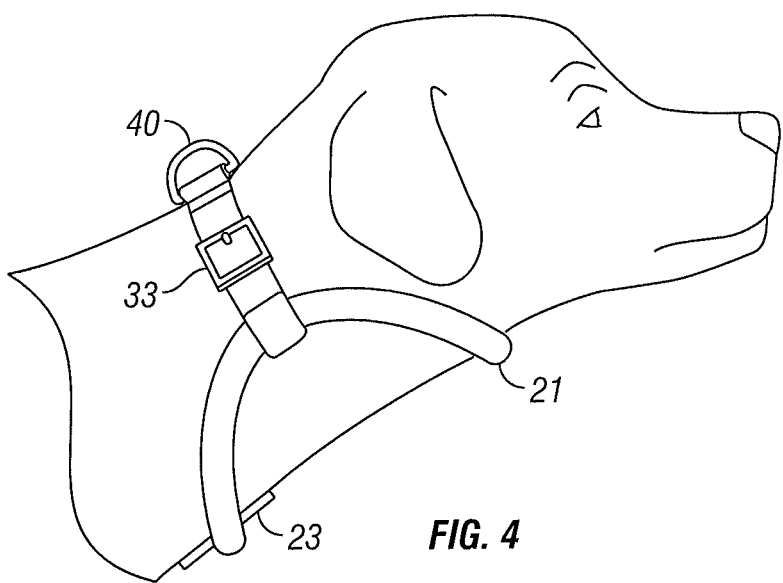
FIG. 4 is a right side view of the dog collar of FIG. 1 positioned on a dog.
Figure 5:
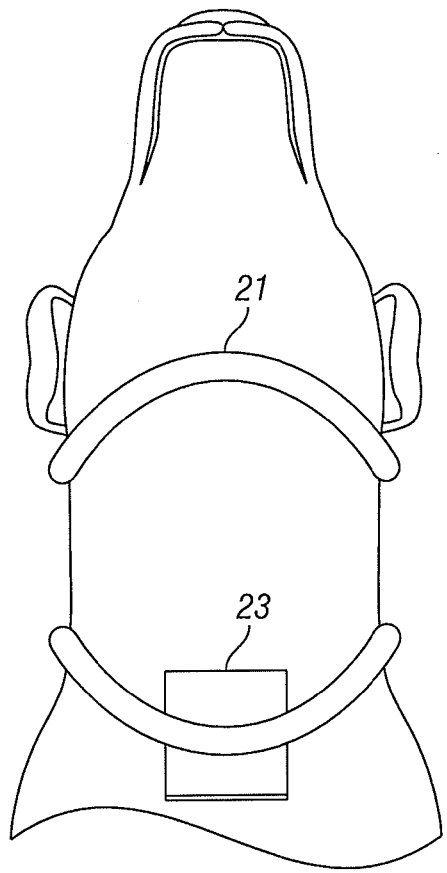
FIG. 5 is a bottom plan view of the dog collar of FIG. 1 positioned on a dog.

Referring to the figures, a dog collar 10 according to one embodiment of the present invention generally includes an arched or curved substantially oval-shaped member 20, a strap 30 and a leash loop 40.

Member 20 includes a first end 21 and a second end 22. In use, first end 21 is positioned under the dog's jaw bone. Member 20 extends up along each side of the dog's neck in an arched manner and continues down between the dog's shoulders such that second end 22 rests on the dog's upper chest. In one embodiment of the invention, second end 22 includes a flattened area 23 where it engages the animal's chest. This is more comfortable for the animal and provides a visual indication as to the proper orientation of collar 10.

The strap 30 has a first end 31 engaging one side of member 20 and a second end 32 engaging the opposite side. Ends 31 and 32 may be looped such that strap 30 is moveable along member 20. Alternatively, ends 31 and 32 may be fixed with respect to member 20. Ends 31 and 32 may be connected to member 20 by any suitable means, such as by stitching, adhesive or mechanical fasteners. Strap 30 further includes an adjustable buckle or clip 33 to allow for adjustment of collar 10 to comfortably fit animals of different sizes. Note also that the size of member 20 will vary depending on the size of the animal with which collar 10 will be used. A leash loop 40 is positioned on strap 30 as shown.

Collar 10 can be positioned on the dog either by loosening strap 30 sufficiently to permit strap 30 to be slid over the top of the dog's head and member 20 to be positioned beneath the dog as described above. Alternatively, buckle or clip 33 can be fully released, member 20 can be positioned beneath the dog and strap 30 can be wrapped around the dog's neck and secured with buckle or clip 33. Note that as positioned on the animal, the collar of the present invention does not overlap the dog's throat or trachea. Thus, pulling on the leash to control the dog's movement does not cause the dog to choke. Note also that member 20 engages each side of the dog's jaw. This assists in controlling the dog during walking because it allows the handler to use the leash to move the dog's head and thereby influence the direction that the dog walks. For example, pulling the leash to the right will cause the member 20 to put pressure on the left side of the dog's neck, thereby tending to orient the dog's head toward the right. This encourages the animal to turn to the right. The opposite result is achieved by pulling the leash to the left.

Figure 6:
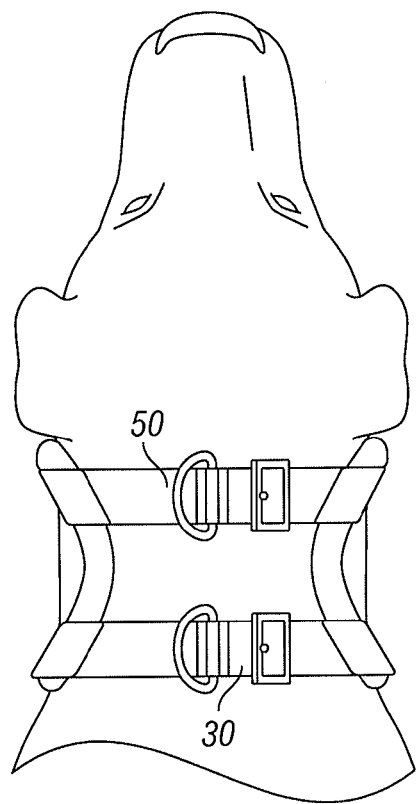
FIG. 6 is a top plan view of an alternative embodiment of a dog collar according to the present invention positioned on a dog.
Figure 7:
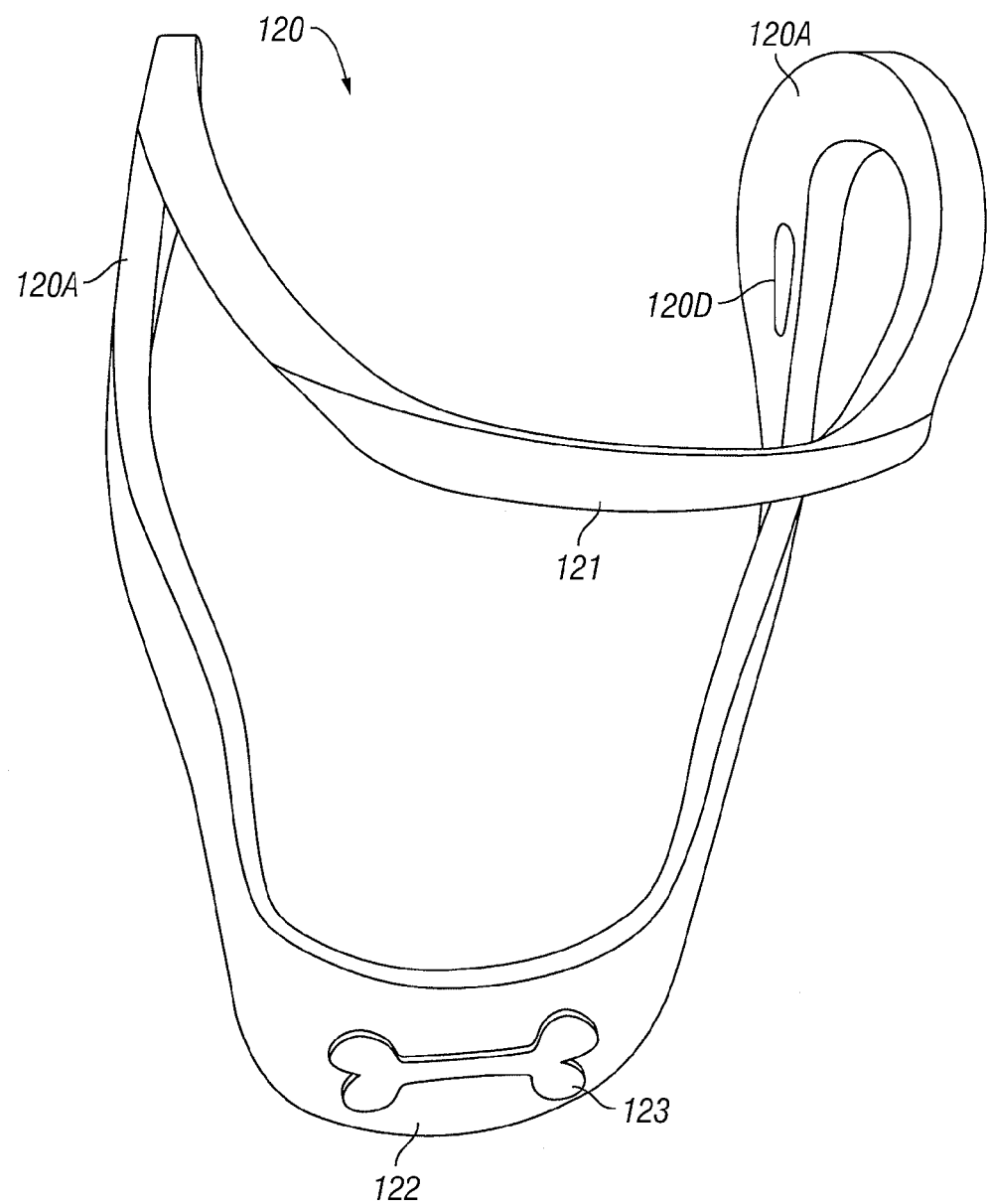
FIG. 7 is a front perspective view of an alternative embodiment of a dog collar according to the present invention.
Figure 8:
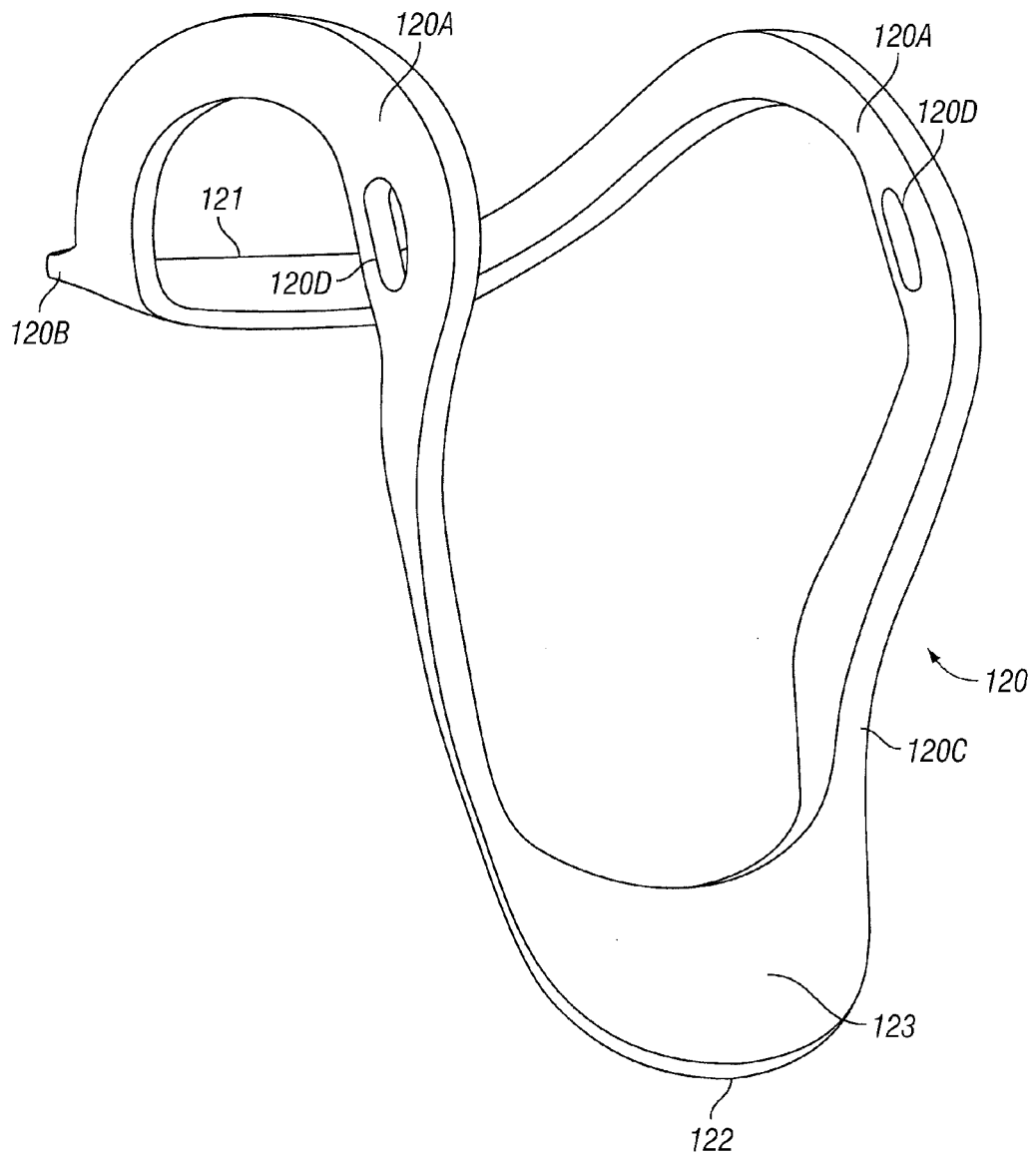
FIG. 8 is a rear perspective view of the dog collar of FIG. 7.
Figure 9:
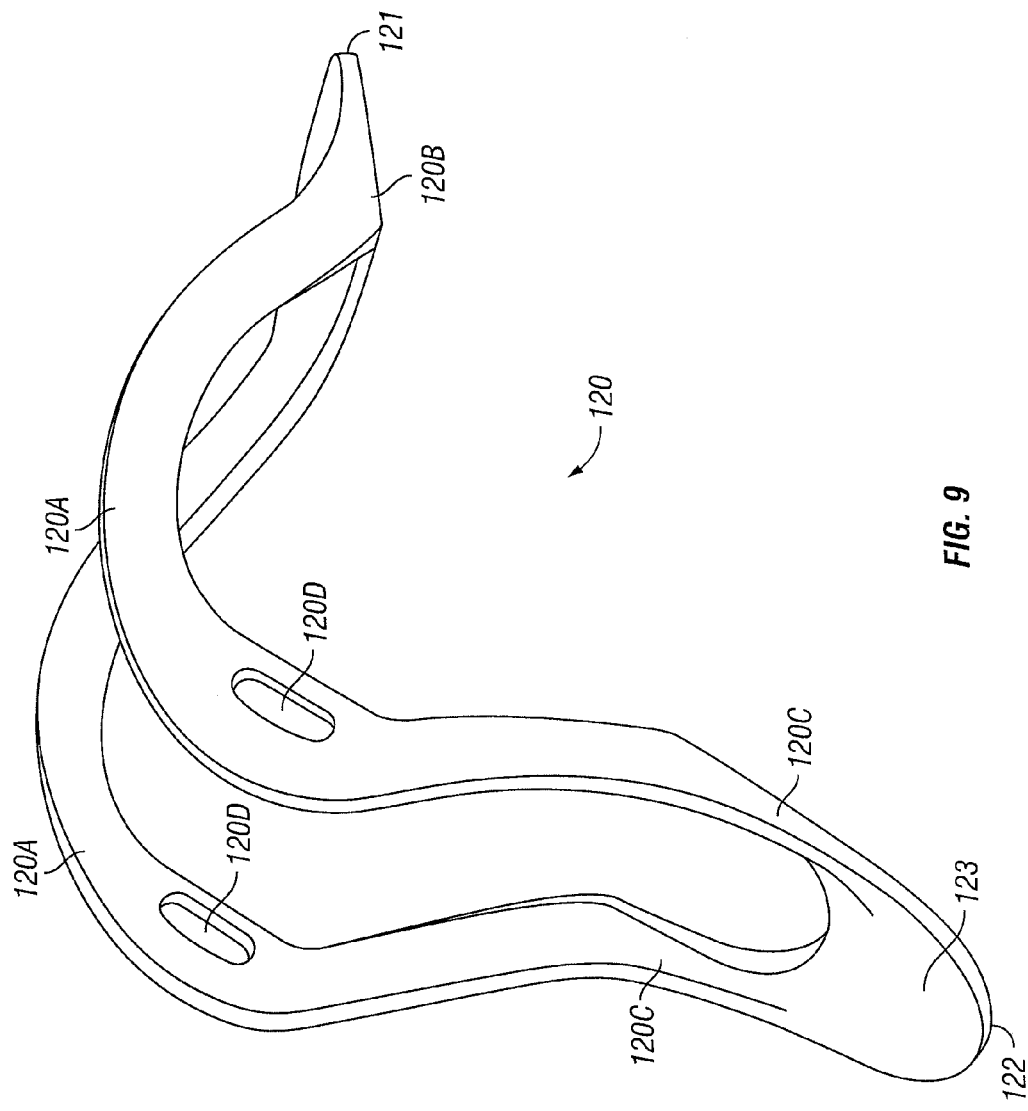
FIG. 9 is a right side perspective view of the dog collar of FIG. 7.
Figure 10:
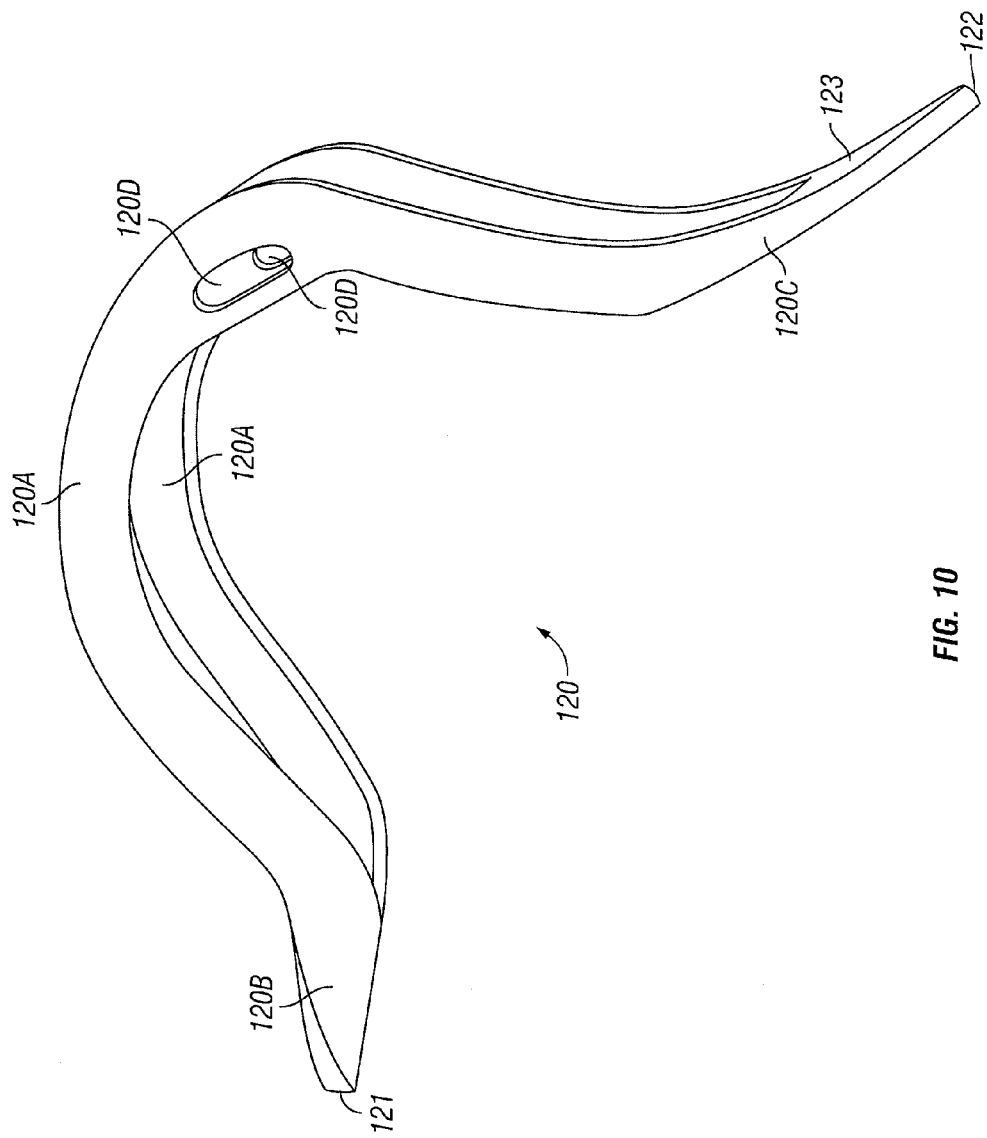
FIG. 10 is a left side perspective view of the dog collar of FIG. 7.
Figure 11:
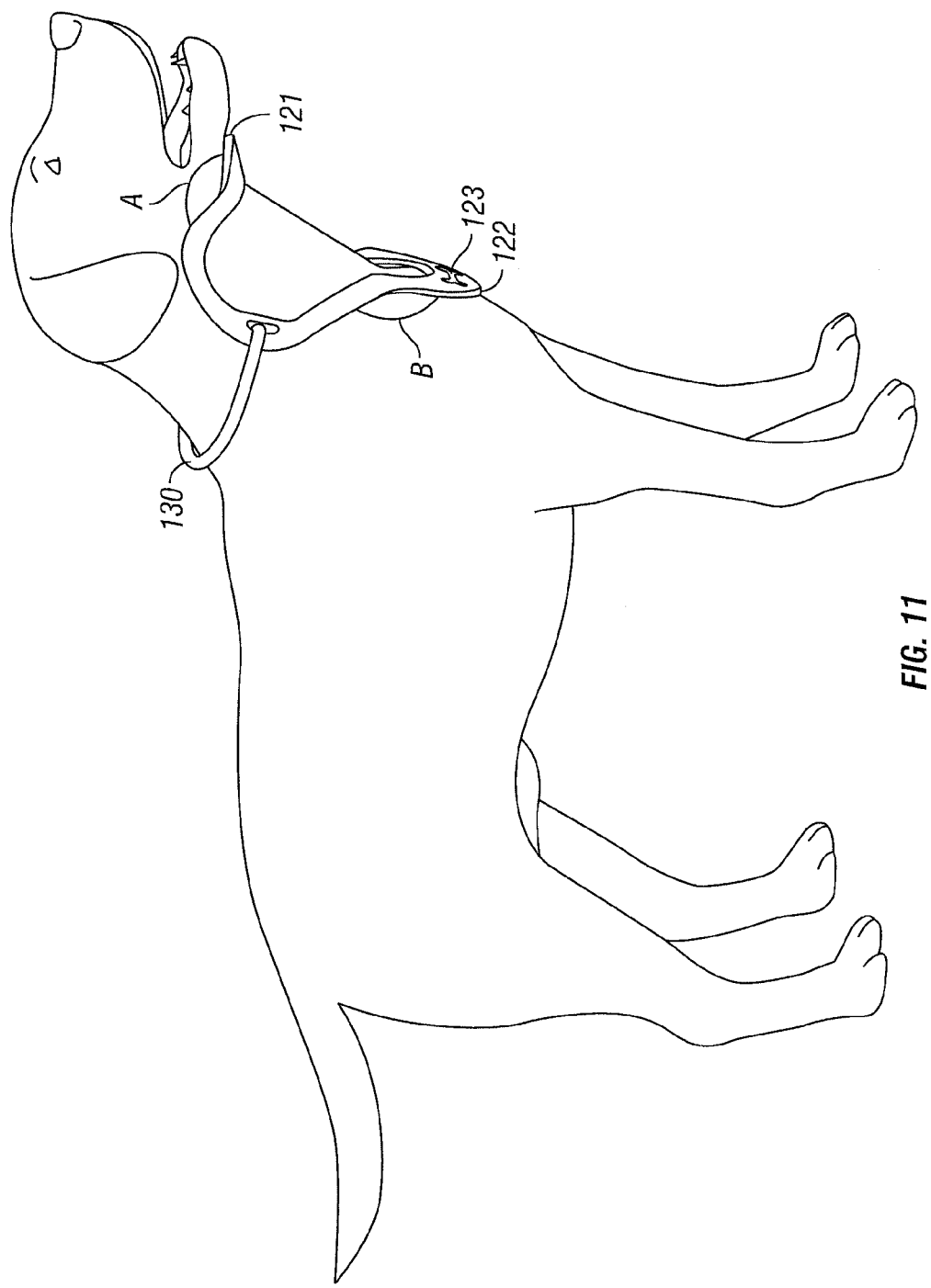
FIG. 11 shows the dog collar of FIG. 7 positioned on a dog.

FIG. 6 shows an alternative embodiment of the present invention that utilizes an additional strap 50. This embodiment is primarily intended for use with large, hard to control animals.

FIGS. 7-11 illustrate a dog collar according to another embodiment of the present invention. Dog collar 110 according to one embodiment of the present invention generally includes a first member 120 and a strap 130. Like member 20 above, member 120 is a substantially closed loop with a central open area.

Member 120 includes first or central sections 120A that are substantially curved or arched members. Second sections 120B are disposed at an angle A with respect to central section 120A. In the embodiment shown, angle A is approximately 135-140 degrees. First end 121 connects sections 120B on opposite sides. Third sections 120C are disposed at an angle B with respect to first sections 120A. In the embodiment shown, angle B is approximately 145-150 degrees. Angles A and B can be varied based on the size and build of the dog to ensure proper placement as described below. Second end 122 connects sections 120C on opposite sides. Member 120 includes a flat area 123 adjacent second end 122. A pair of openings or holes 120D are provided in sections 120A for receiving the ends of strap 130. A leash may be connected directly to strap 130. Alternatively, a leash loop may be provided on strap 130. Strap 130 may be adjustable and/or may include buckles or other connecting members to facilitate positioning the collar on the dog as described above.

In use, first end 121 is positioned under the dog's jaw bone. Sections 120A extend up along each side of the dog's neck in an arched manner and continue down between the dog's shoulders such that second end 122 rests on the dog's upper chest.

Note that like the other embodiments described above, as positioned on the animal, the central open area of the collar is positioned over the dog's throat and trachea and no portion of the collar overlaps the throat or trachea. Thus, pulling on the leash to control the dog's movement does not cause the dog to choke. Note also that sections 120A engage each side of the dog's jaw. This assists in controlling the dog during walking because it allows the handler to use the leash to move the dog's head and thereby influence the direction that the dog walks. For example, pulling the leash to the right will cause the member 20 to put pressure on the left side of the dog's neck, thereby tending to orient the dog's head toward the right. This encourages the animal to turn to the right. The opposite result is achieved by pulling the leash to the left.

The device of the present invention can be made from any materials suitable to permit the appropriate pressure to be applied to the animal for proper control. Members 20 and 120 are preferably relatively lightweight, substantially rigid members with only a moderate degree of flexibility. Members 20 and 120 may include a soft cloth or other covering to provide additional comfort to the animal. Straps 30 and 130 can be produced from a wide variety of materials, including those presently used to produce commercially available dog collars.

Although the present invention has been shown and described in detail the same is to be taken by way of example only and not by way of limitation. Numerous changes can be made to the embodiments shown without departing from the scope of the invention. The present invention may be further modified within the spirit and scope of this disclosure. The application is, therefore, intended to cover any variations, uses, or adaptations of the invention using its general principles. Further, this application is intended to cover such departures from the present disclosure as come within known or customary practice in the art to which this invention pertains.

What is claimed is:

1. A dog training and control device comprising:
   first and second laterally opposed neck-engaging sections, each neck-engaging section including a flexible, semi-rigid neck-engaging arched member, having substantially flat surfaces and adapted to engage respective lateral areas of a dog's neck when the device is worn by the dog, each of the neck engaging arched members formed from a first arch portion, a central arch portion and a second arch portion;
   a front section extending between the first arch portions of said first and second laterally opposed neck-engaging sections, the front section including a plate having a substantially flat surface, the flat surface forming an angle of approximately 135 to 140 degrees with the first arch portions of the neck-engaging arched members;
   a chest-engaging plate extending between the second arch portions of said first and second laterally opposed neck-engaging sections and having a substantially flat chest-engaging surface adapted to engage the dog's chest, the chest-engaging surface extending to the neck-engaging strap surfaces and forming an angle of approximately 145 to 150 degrees with the second arch portions of the neck engaging arched members;
   wherein the first arch portion extends upwardly from said front section to said central arch portion, said second arch portion extends downwardly from said central arch portion to said chest-engaging plate;
   a securing strap for selectively securing said first neck-engaging section to said second neck-engaging section to secure the device on the dog, the securing strap having a loop for connecting a leash thereto;
   the first and second laterally opposed neck-engaging sections, front section and chest section being molded as a unitary single-piece structure; the first and second laterally opposed neck-engaging section surfaces, front section surfaces and chest section surface defining a continuous surface, adapted to engage the dog's neck, jaw and chest, respectively, and forming a loop for surrounding the dog's tracheal region,
   the first and second laterally opposed neck-engaging sections, front section and chest section forming a loop defining an opening adapted to overlap, and thereby avoid contact of the device with, the dog's tracheal region,
   whereby the first and second laterally opposed neck-engaging sections and chest section cooperate to transfer pulling forces on the securing strap to the lateral areas of the dog's neck and to the dog's chest to thereby provide control of the dog without substantial pressure on the dog's tracheal region.

2. The device according to claim 1, further comprising a molded opening in each of the first and second laterally opposed neck-engaging sections for permitting the strap to be fastened thereto.

3. The device of claim 1, wherein the first arch portions of the laterally opposed neck-engaging sections each include an arcuate portion extending from the front section and wherein the second arch portions of the laterally opposed neck-engaging sections include a substantially straight portion.

4. The device according to claim 1, wherein the front section includes a substantially flat surface of sufficient width to accommodate the dog's lower jaw, and wherein the chest-engaging plate includes a substantially flat surface of sufficient width to accommodate the dog's chest.

5. The device of claim 1, wherein the securing strap is connected to the laterally opposed neck-engaging sections by looped ends such that the strap is movable along the laterally opposed neck engaging sections.

6. The device of claim 1, wherein the front section includes a surface for restricting movement of the dog's head and lower jaw, and wherein the chest-engaging plate includes a substantially flat surface adapted to engage the dog's chest, and wherein the angle between the front section surface and chest-engaging plate surface is such that the device maintains the dog's head in an upright, forward looking orientation.

7. The device of claim 1, further comprising a second strap for selectively securing the first laterally opposed neck-engaging section to the second laterally opposed neck-engaging section to secure the device on the dog.

8. A dog training and control device comprising
   first and second laterally opposed neck-engaging sections, each neck-engaging section including a flexible, semi-rigid neck-engaging arched member having substantially flat surfaces and adapted to engage respective lateral areas of a dog's neck, each of the neck engaging arched members including a first arch portion and a second arch portion;

a front section connecting the first arch portions of said first and second laterally opposed neck-engaging sections and having an arcuate shape, the front section including a plate having a substantially flat surface, the flat surface forming an angle of approximately 135 to 140 degrees with the first arch portions of the neck-engaging arched members;

a chest-engaging plate connecting the second arch portions of said first and second laterally opposed neck-engaging sections and including a flat chest-engaging surface for engaging the dog's chest, the chest-engaging surface forming an angle of approximately 145 to 150 degrees with the second arch portions of the neck-engaging arched members;

wherein said first arch portion and said second arch portion are joined such that the first arch portion extends upwardly from said front section to an apex point and said second arch portion extends downwardly from said apex point to said chest engaging plate;

the neck-engaging sections, front section and chest-engaging plate forming a loop that substantially surrounds, but does not engage, the dog's tracheal region;

a securing strap connecting said first neck-engaging section to said second neck-engaging section and adapted to secure the device on the dog, the strap having a leash loop for connecting a leash thereto;

wherein the first and second laterally opposed neck-engaging sections, front section and chest engaging section are molded as a unitary piece from a substantially rigid material with a moderate degree of flexibility and wherein leash pulling forces applied to the device result in pressure on the lateral areas of the dog's neck and the dog's chest, without pressure on the dog's tracheal region.

9. The device of claim 8, further comprising an opening molded in each of the first and second laterally opposed neck-engaging sections for permitting the securing strap to be fastened thereto.

10. The device of claim 8, wherein the first arch portions each define a substantially arcuate portion and said second arch portions each define a substantially straight portion.

11. The device of claim 8, wherein the front section flat surface is of sufficient width to accommodate the dog's lower jaw, and wherein the chest-engaging plate is of sufficient width to accommodate the dog's chest.

12. The device of claim 8, wherein the securing strap is connected to the laterally opposed neck-engaging sections by loops.

13. The device of claim 8, wherein the front section surface is adapted to limit movement of the dog's head and lower jaw, and wherein the angle between the front section surface and chest-engaging plate is such that the device maintains the dog's head in an upright, forward looking orientation.

* * * * *